Patented Oct. 14, 1930

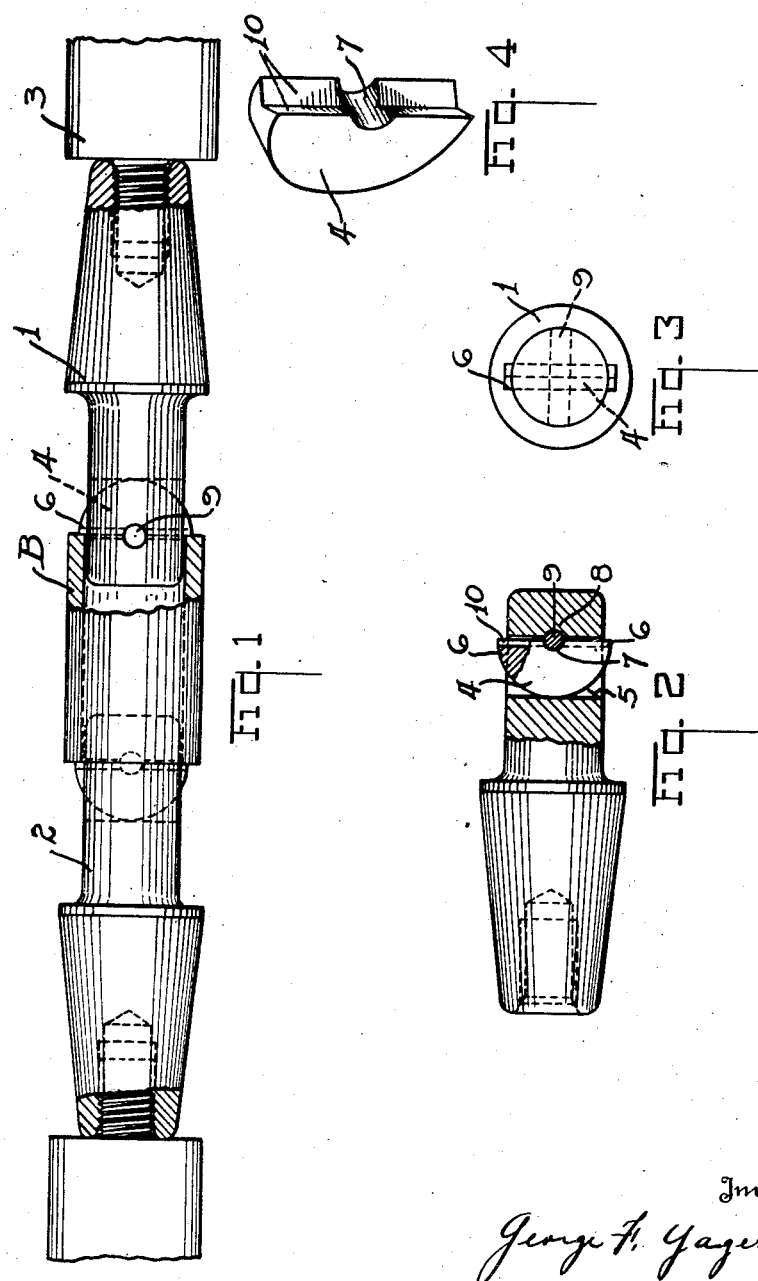

1,778,516

UNITED STATES PATENT OFFICE

GEORGE F. YAGER, OF TOLEDO, OHIO, ASSIGNOR TO THE BUNTING BRASS & BRONZE COMPANY, OF TOLEDO, OHIO, A CORPORATION

BUSHING ARBOR

Application filed September 18, 1929. Serial No. 393,557.

This invention relates to machines for turning bushings but more particularly to an arbor for such machines, and an object is to provide a simple and efficient arbor which is adapted to compensate for irregularities in form and size of the bushings so that the latter are securely retained in position during the turning operation.

Other objects will hereinafter appear and the invention is shown by way of illustration in the accompanying drawings in which—

Figure 1 is a side elevation of a portion of a bushing turning machine showing arbors positioned to engage a bushing for turning operation; Fig. 2 is a side elevation partly in section of an arbor showing the bushing abutment member; Fig. 3 is an end view of the arbor; Fig. 4 is an enlarged perspective view of a bushing abutment member.

In turning bushings it has heretofore been proposed to provide a pair of axially aligned arbors to receive a bushing therebetween, and by imparting a longitudinal reciprocatory movement to the arbors relative to the turning tool, the operation is performed, it being understood that during this operation the arbors are being rapidly rotated. It has been somewhat of a problem securely to hold the bushings on the arbors so that they will rotate with them while in engagement with the turning tool. This invention overcomes this problem in a simple and efficient manner as will appear from the following description, being that of a preferred embodiment of the invention.

In the drawings, identical arbors 1 and 2 in axially aligned relation are suitably connected to chucks 3 forming a part of the turning machine. The operation of the chucks forms no part of this invention, and suffice it to say for the purpose of clearly understanding the following description that reciprocatory and rotating movements are imparted to the arbors so that a bushing B is moved with respect to a tool (not shown) to effect the turning operation. Ordinarily end pressure is exerted in opposite directions on the arbors securely to clamp the bushing in position.

In this instance, opposite ends of the bushing B engage abutment members 4 carried by the arbors 1 and 2. Each abutment member is disposed in a transverse slot or opening 5 formed in the respective arbor and portions 6 of such member project a slight distance beyond the outer ends of the opening. The abutment members are substantially semicircular in form and a portion of the rounded peripheral surface abuts against a wall of the opening 5. Disposed in a groove 7 and a registering groove 8 in the opposite wall of the opening 5 is a pin 9 which provides a pivotal mounting for the abutment member. The bushing-engaging edge of each abutment member is shaped to provide sharp edges 10 extending radially of the groove 7.

In practice the arbors 1 and 2 are separated from each other a sufficient distance to permit a bushing to be slipped over the noses of the arbors when the latter are moved toward each other. As shown the noses of the arbors extend into the bushing B until the ends of the bushing engage the abutment members 4.

If the ends of the bushing are irregular or uneven which is not infrequently the case, the abutment members are capable of tilting sufficiently to compensate for such irregularity so that when end pressure is exerted by the arbors 1 and 2 against opposite ends of the bushing B substantially uniform pressure is imparted to it. In this manner the bushing is securely and firmly retained in position during the reciprocatory rotative movements imparted to it. The sharp edges 10 militate against the bushing slipping during the turning operation and assist in effecting an efficient connection. The above described means for securely holding the bushing in place relative to the arbors has proved most satisfactory and its marked simplicity contributes to a very desirable arrangement free from complexity.

Numerous changes in details of construction and arrangement may be effected without departing from the spirit of the invention.

What I claim is:

1. An arbor composed of a body having a transverse slot adjacent one end thereof, an abutment member in said slot projecting beyond the ends thereof, said body and member having registering complementary grooves, and the member having a curved rear face formed to abut the inner wall defining said slot and a pin extending through the registering grooves for holding said member against movement out of the slot while permitting same to have bodily movement axially of the body so as to abut said wall.

2. An arbor composed of a body having a transverse slot adjacent one end thereof, an abutment member in said slot projecting beyond the ends thereof, said member having a curved rear face to engage the inner wall defining the slot, and means for pivotally and loosely mounting the member in the slot whereby the member can bodily move axially of the body to engage said wall of the slot.

In testimony whereof I have hereunto signed my name to this specification.

GEORGE F. YAGER.